US012714256B2

(12) United States Patent
Buck et al.

(10) Patent No.: US 12,714,256 B2
(45) Date of Patent: Aug. 25, 2026

(54) VENTING APPLIANCE LID

(71) Applicant: Sunbeam Products, Inc., Atlanta, GA (US)

(72) Inventors: David Buck, Delray Beach, FL (US); Stephen Vernaglia, Delray Beach, FL (US); Mike Tang, Kowloon Bay (HK)

(73) Assignee: Sunbeam Products, Inc., Atlanta, GA (US)

( * ) Notice: Subject to any disclaimer, the term of this patent is extended or adjusted under 35 U.S.C. 154(b) by 67 days.

(21) Appl. No.: 18/700,763

(22) PCT Filed: Oct. 12, 2022

(86) PCT No.: PCT/US2022/077949
§ 371 (c)(1),
(2) Date: Apr. 12, 2024

(87) PCT Pub. No.: WO2023/064796
PCT Pub. Date: Apr. 20, 2023

(65) Prior Publication Data

US 2024/0407592 A1 Dec. 12, 2024

Related U.S. Application Data

(60) Provisional application No. 63/256,188, filed on Oct. 15, 2021.

(51) Int. Cl.
*A47J 36/06* (2006.01)
*A47J 43/07* (2006.01)

(52) U.S. Cl.
CPC .......... *A47J 36/06* (2013.01); *A47J 43/0716* (2013.01); *A47J 43/0761* (2013.01)

(58) Field of Classification Search
CPC ........ A47J 36/06; A47J 36/10; A47J 43/0716; A47J 43/046; B01F 35/189; B01F 35/45; B01F 2101/1805
(Continued)

(56) References Cited

U.S. PATENT DOCUMENTS 1,736,173 A * 11/1929 Reid .................. B60K 15/0406 220/366.1
4,413,748 A * 11/1983 Kessler ................ B65D 43/021 220/366.1

(Continued)

FOREIGN PATENT DOCUMENTS

| CN | 209808090 U | 12/2019 |
|---|---|---|
| KR | 101408895 B1 | 6/2014 |

*Primary Examiner* — Ernesto A Grano
*Assistant Examiner* — Symren N Sanghera
(74) *Attorney, Agent, or Firm* — Husch Blackwell LLP

(57) ABSTRACT

A venting appliance lid includes an outer sealing section having a rim and a shoulder defining a central opening and a skirt; a center cap having a flange and a cup, wherein in a fully inserted position the flange rests on the shoulder; wherein an inner diameter of the skirt is separated by a gap from an outer diameter of the cup; the skirt having an expansion notch and the cup having a locking tab, wherein the center cap is rotatable relative to the outer sealing section to align the locking tab with the expansion notch and wherein the expansion notch allows the locking tab to travel a vertical distance equal to the height of the expansion notch; and wherein pressure on the center cap raises the center cap to form a vent path that is open to atmosphere while preventing the center cap from being ejected.

22 Claims, 14 Drawing Sheets

(58) Field of Classification Search
USPC .......................................................... 220/367.1
See application file for complete search history.

(56) References Cited

U.S. PATENT DOCUMENTS

| | | | | |
|---|---|---|---|---|
| 5,634,566 | A * | 6/1997 | Jansen | B65F 1/1615 220/254.1 |
| 5,791,473 | A * | 8/1998 | Decker | G03C 3/00 220/366.1 |
| 6,041,982 | A * | 3/2000 | Cautereels | B65D 25/48 220/366.1 |
| 9,895,028 | B2 * | 2/2018 | Gerard | A47J 43/046 |
| 2006/0261066 | A1 * | 11/2006 | Boozer | A47J 43/0727 D7/378 |
| 2010/0001000 | A1 * | 1/2010 | Baughman | B65D 47/123 222/566 |
| 2012/0037587 | A1 * | 2/2012 | Tirosh | A61J 9/04 220/366.1 |
| 2016/0287018 | A1 * | 10/2016 | Thomas | A47J 43/0716 |
| 2019/0099042 | A1 * | 4/2019 | Leppert | A47J 43/046 |
| 2021/0052113 | A1 * | 2/2021 | Thomas | A47J 43/0727 |
| 2021/0068584 | A1 * | 3/2021 | Cheng | A47J 36/027 |

* cited by examiner

VENTING APPLIANCE LID

CROSS REFERENCE

This application is a U.S. National Phase Application of International Application No. PCT/US2022/077949 filed Oct. 12, 2022, which claims priority to U.S. Provisional Patent Applications No. 63/256,188 filed on Oct. 15, 2021, the entire disclosure of which is hereby incorporated by reference.

TECHNICAL FIELD

The present disclosure is directed to small kitchen appliances and, more particularly, to lids for such appliances, for example, blenders.

BACKGROUND OF THE DISCLOSURE

When appliances containing hot liquid, particularly those in which the liquid is agitated, for example, a blender, the agitation of the hot liquid quickly heats the air inside the blender jar. The resulting increase in pressure within the jar can eject the hot liquid contents out through any gaps that may exist or actually push the jar lid out of position, allowing even greater quantities of hot liquid to rapidly escape from the jar. This creates a significant safety hazard as the escaping hot liquid may be sufficiently heated to burn any individuals located near the blender. Of course, even if no one is injured, the ejection of liquid from the blender can create an extremely unpleasant mess that the user must clean up.

Many blenders in the marketplace have a lid with a cap that is positioned in the center of the lid and held in place by friction fit or locking tabs and is removable to vent pressure within the blender jar if hot liquids are being blended. However, these blenders have a reduced capacity—typically marked with some form of a "Maximum" fill mark—when the center cap is in place. In addition, because these products require removal of the center cap to vent pressure while the blender is being operated, the user must find some means to loosely cover the opening left by the removal of the center cap to prevent the escape of the liquid contents while still allowing pressure to vent. Typically, a user will hold a folded towel over the open portion of the lid. Other products utilize a center cap with a series of baffled vents that direct exhaust excess pressure to atmosphere in a controlled manner while minimizing the release of liquid. However, these configurations are significantly more complex, more expensive, and more difficult to manufacture. They also typically take up considerable space within the jar when the cap is in place, which limits the capacity of the jar.

Therefore, a need exists for an improved means to allow pressure to be exhausted from within small appliances used with heated liquids while preventing liquid from escaping from the appliance as well.

SUMMARY

An aspect of the present disclosure is to provide a venting appliance lid that includes an outer sealing section having a rim and a shoulder defining a central opening and a downwardly depending skirt: a center cap having a flange and a cup downwardly depending from the flange, wherein in a fully inserted position of the center cap relative to the outer sealing section the flange rests on the shoulder; wherein at least a portion of the downwardly depending skirt is provided with an inner diameter spaced by a gap from an outer diameter of the downwardly depending cup, the gap forming part of a vent path between the outer sealing section and the center cap: the downwardly depending skirt having at least one expansion notch and the downwardly depending cup having at least one locking tab, wherein the center cap is rotatable relative to the outer sealing section to align the locking tab with the expansion notch and wherein the expansion notch allows the locking tab to travel a vertical distance equal to a height of the expansion notch; and wherein exertion of a force on an underside of the center cap while the locking tab is aligned with the expansion notch raises the center cap and separates the flange from the shoulder thereby opening the vent path to atmosphere.

According to another aspect of the present disclosure, a venting appliance lid is provided that includes an outer sealing section having a rim and a shoulder defining a central opening and at least one downwardly depending skirt; a center cap having a flange and at least one rail depending downwardly from the flange, wherein in a fully inserted position of the center cap within the central opening the flange rests on the shoulder: a vent path between the at least one downwardly depending skirt of the outer sealing section and the center cap: the downwardly depending skirt having at least one expansion notch and the at least one downwardly depending rail having at least one locking tab, wherein the center cap is rotatable relative to the outer sealing section to align the at least one locking tab with the at least one expansion notch and wherein the expansion notch is provided with a height allowing the locking tab to travel a vertical distance equal to the height of the expansion notch; and wherein exertion of a force on an underside of the center cap while the locking tab is aligned with the expansion notch raises the center cap by the vertical distance and separates the flange from the shoulder thereby opening the vent path to atmosphere.

According to yet another aspect of the present disclosure, there is provided an associated method of closing an open top of an appliance jar while allowing pressure generated that includes the steps of providing a venting appliance lid that includes an outer sealing section having a rim and a shoulder defining a central opening and at least one downwardly depending skirt: a center cap having a flange and a cup downwardly depending from the flange, wherein in a fully inserted position of the center cap within the central opening the flange rests on the shoulder; wherein at least a portion of the downwardly depending skirt is provided with an inner diameter spaced by a gap from an outer diameter of the downwardly depending cup, the gap defining a first portion of a vent path between the outer sealing section and the center cap: the downwardly depending skirt having at least one expansion notch and the downwardly depending cup having at least one locking tab, wherein the center cap is rotatable relative to the outer sealing section to align the at least one locking tab with the at least one expansion notch and wherein the expansion notch is provided with a height allowing the locking tab to travel a vertical distance equal to the height of the expansion notch; and wherein exertion of a force on an underside of the center cap while the locking tab is aligned with the expansion notch raises the center cap by the vertical distance and separates the flange from the shoulder opening the vent path to atmosphere; inserting the center cap into the outer sealing section by inserting locking tab into the at least one vertical tab track until the locking tab encounters the vertical tab stop; and rotating the center cap until the locking tab is aligned with the at least one expansion notch such that the center cap may be raised without being ejected from the outer sealing section.

These aspects are merely illustrative of the innumerable aspects associated with the present disclosure and should not be deemed as limiting in any manner. These and other aspects, features and advantages of the present disclosure will become apparent from the following detailed description when taken in conjunction with the referenced drawings.

BRIEF DESCRIPTION OF DRAWINGS

Reference is now made more particularly to the drawings, which illustrate the best presently known mode of carrying out the disclosure and wherein similar reference characters indicate the same parts throughout the views.

DETAILED DESCRIPTION

Figure 1:
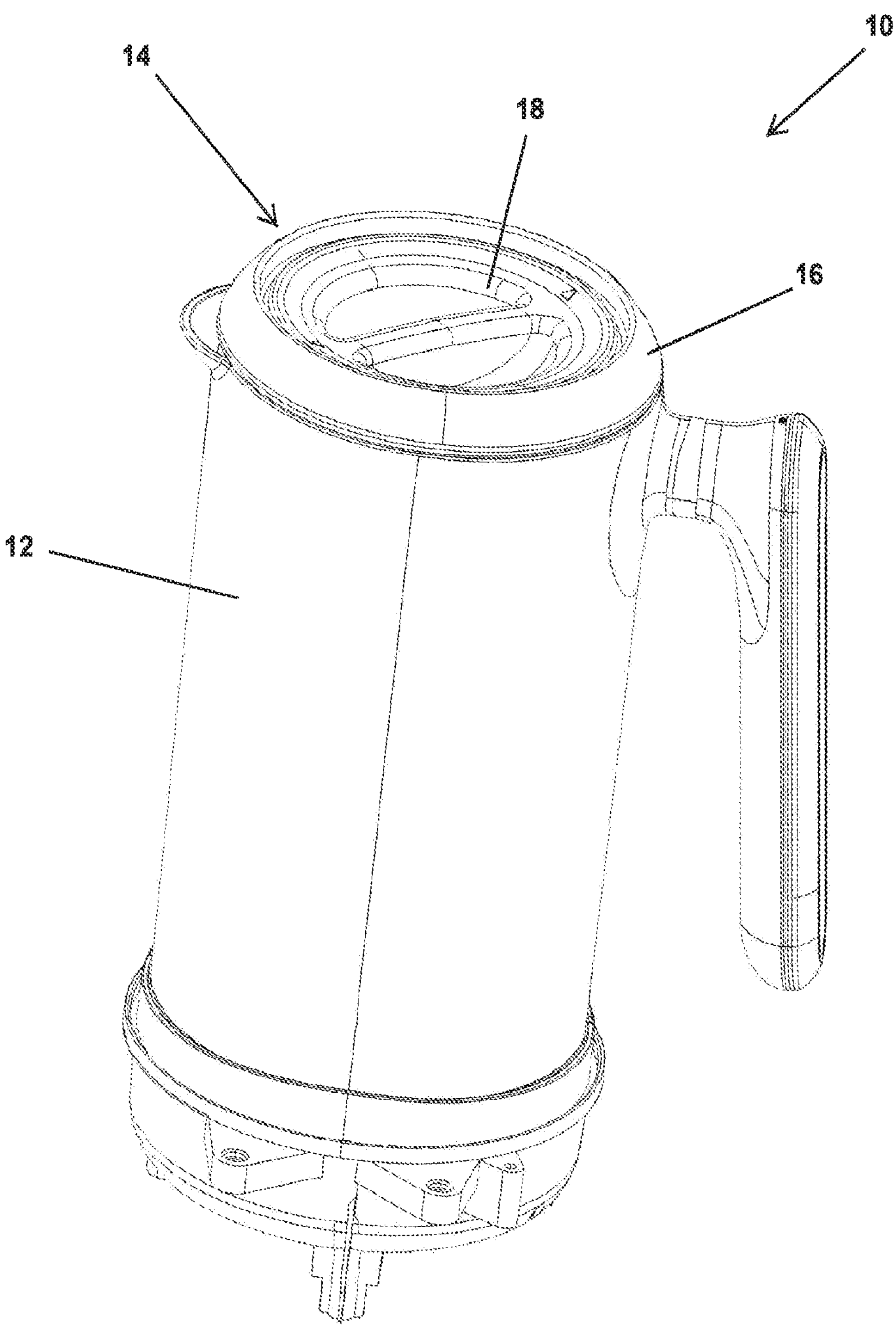
FIG. 1 is a perspective of a blender incorporating an embodiment of a venting appliance lid according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Introduction" and "Summary") and sub-headings used herein are intended only for general organization of topics within the present disclosure, and are not intended to limit the disclosure of the technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the apparatus and systems of this technology and, unless explicitly stated otherwise, are not intended to be a representation that given embodiments of this technology have, or have not, been made or tested.

As referred to herein, all compositional percentages are by weight of the total composition, unless otherwise specified. As used herein, the word "include." and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

"A" and "an" as used herein indicate "at least one" of the item is present; a plurality of such items may be present, when possible. "About" when applied to values indicates that the calculation or the measurement allows some slight imprecision in the value (with some approach to exactness in the value: approximately or reasonably close to the value: nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range.

Figure 2:
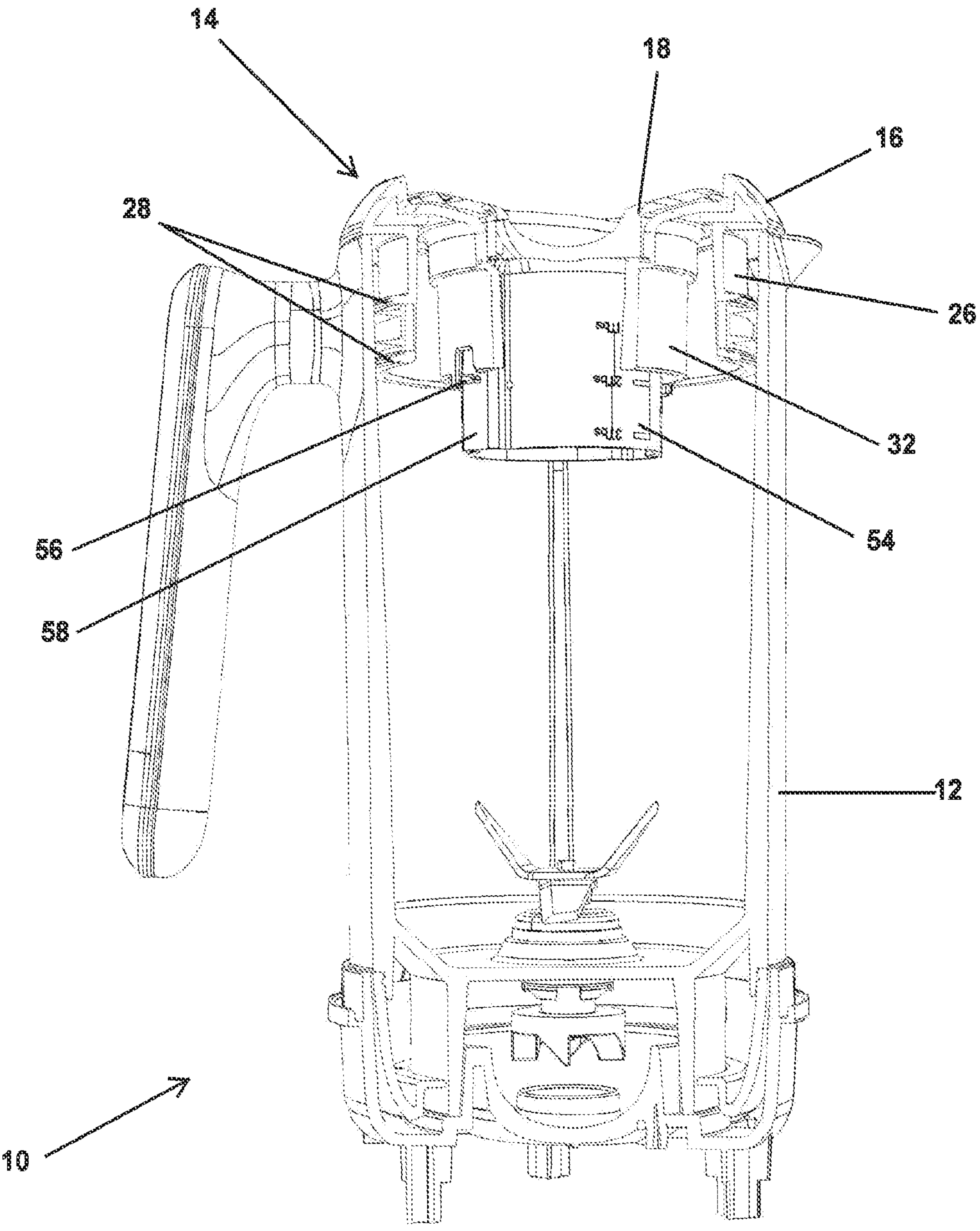
FIG. 2 is a partial section view of the blender of FIG. 1.
Figure 3:
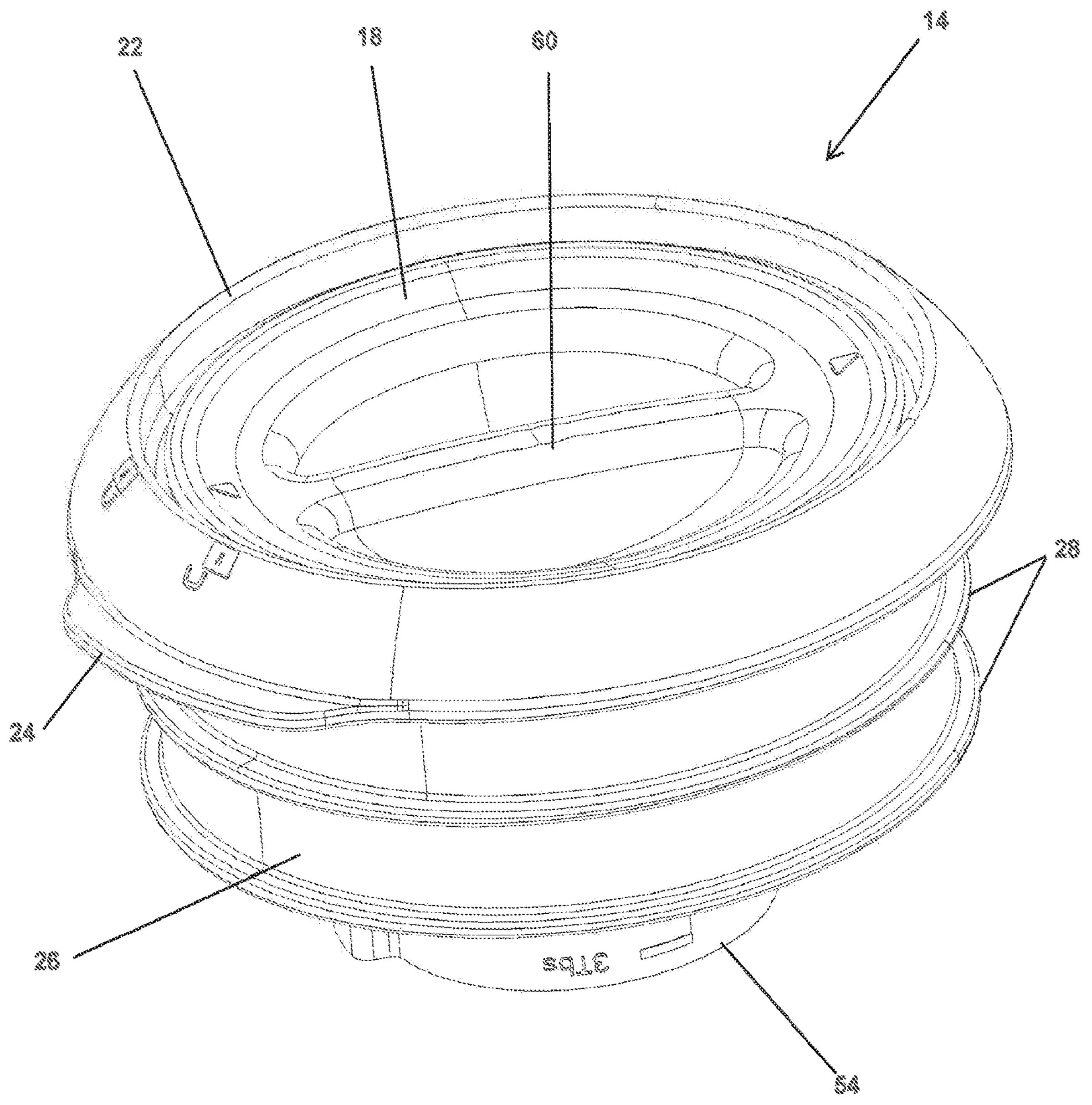
FIG. 3 is a top perspective view of a venting appliance lid according to an embodiment of the present disclosure.
Figure 4:
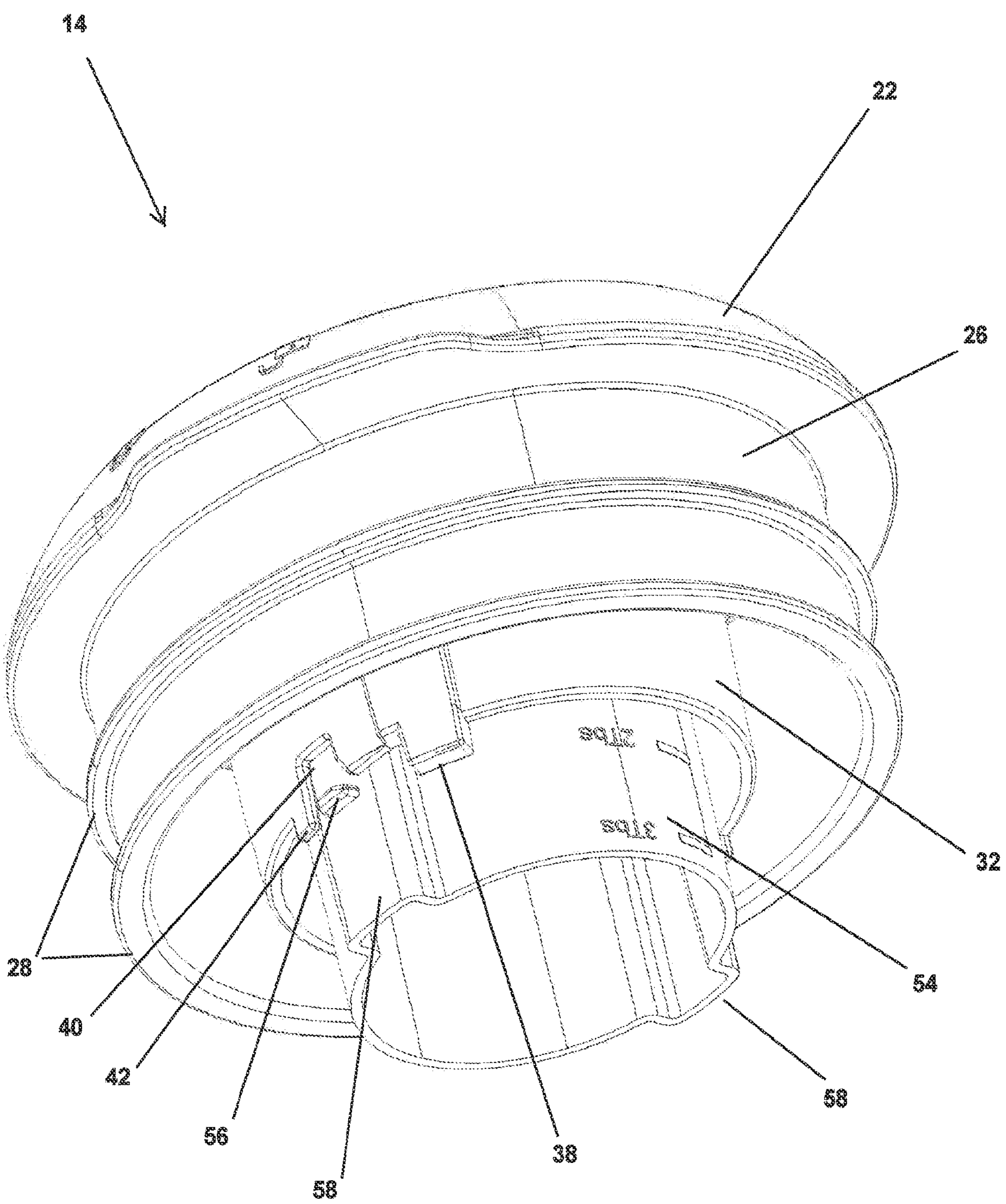
FIG. 4 is a bottom perspective view of the venting appliance lid of FIG. 3.

FIGS. 1 and 2 illustrate a blender 10 incorporating an embodiment of a venting appliance lid 14 according to the present disclosure. While the venting appliance lid 14 is described in the illustrated examples herein as a blender lid, it should be appreciated that embodiments of the lid 14 may be used with other kitchen appliances. However, in the current example, the venting appliance lid 14 closes the open upper end of the blender jar 12 to contain the contents of the blender 10 during operation.

FIGS. 3-6 further illustrate an embodiment of a venting appliance lid 14 in more detail. The venting appliance lid 14 includes an annular outer sealing portion 16 and a center cap 18. The center cap 18 is inserted through a central opening 20 in the outer sealing portion 16. The outer sealing portion 16 includes a lid rim 22 with an extension at one area to form a lifting flange 24 that a user may grasp to pull the venting appliance lid 14 upward and out of the blender jar 12. An outer skirt 26 depending downwardly on the underside of the lid rim 22 is provided with one or more flexible sealing flanges 28. The sealing flanges engage with the interior surface of the blender jar 12 when the venting appliance lid 14 is inserted into the blender jar 12 to form a seal between the venting appliance lid 14 and blender jar 12.

Figure 7:
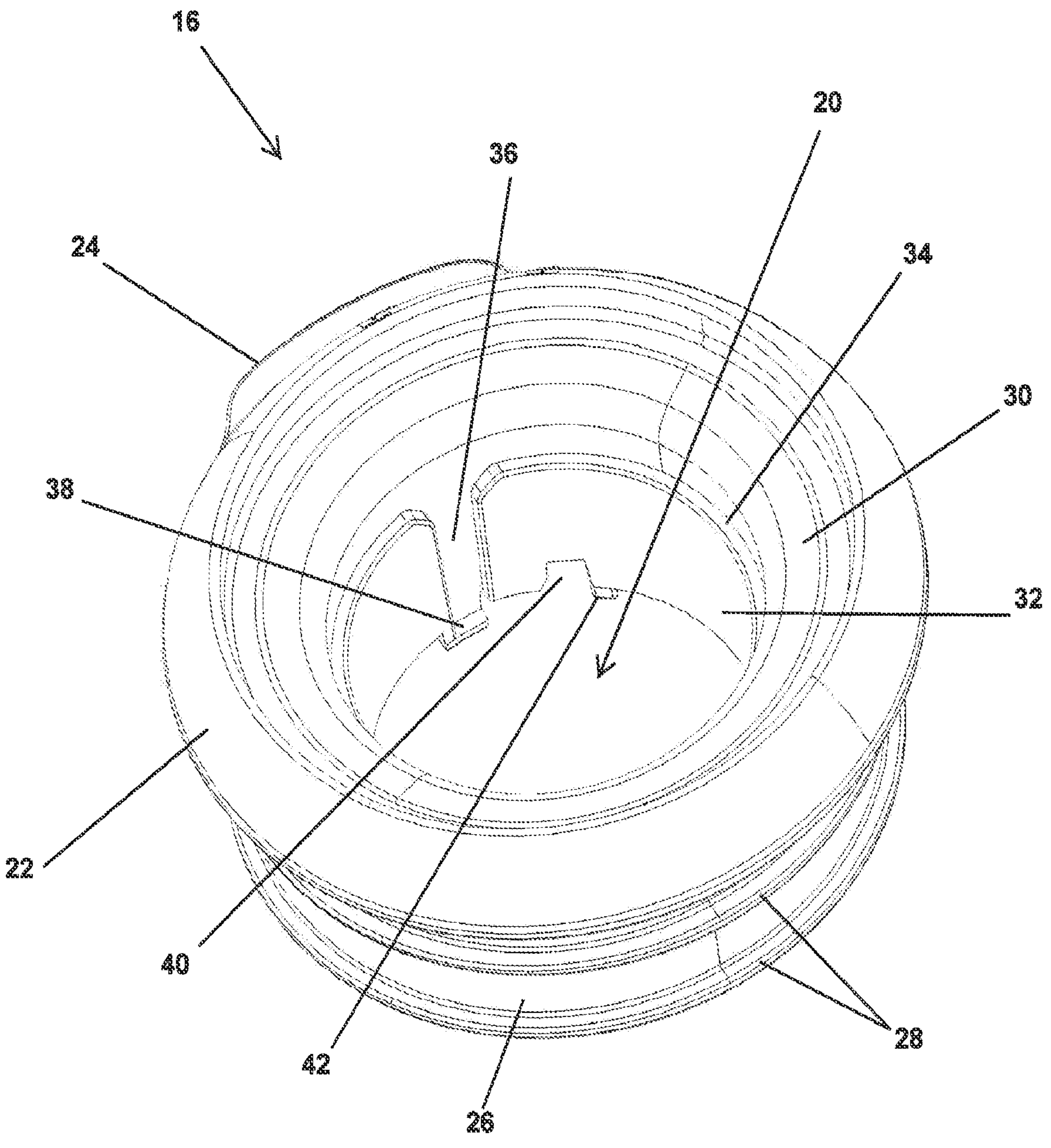
FIG. 7 is a top perspective view of an outer sealing section of a venting appliance lid according to an embodiment of the present disclosure.
Figure 8:
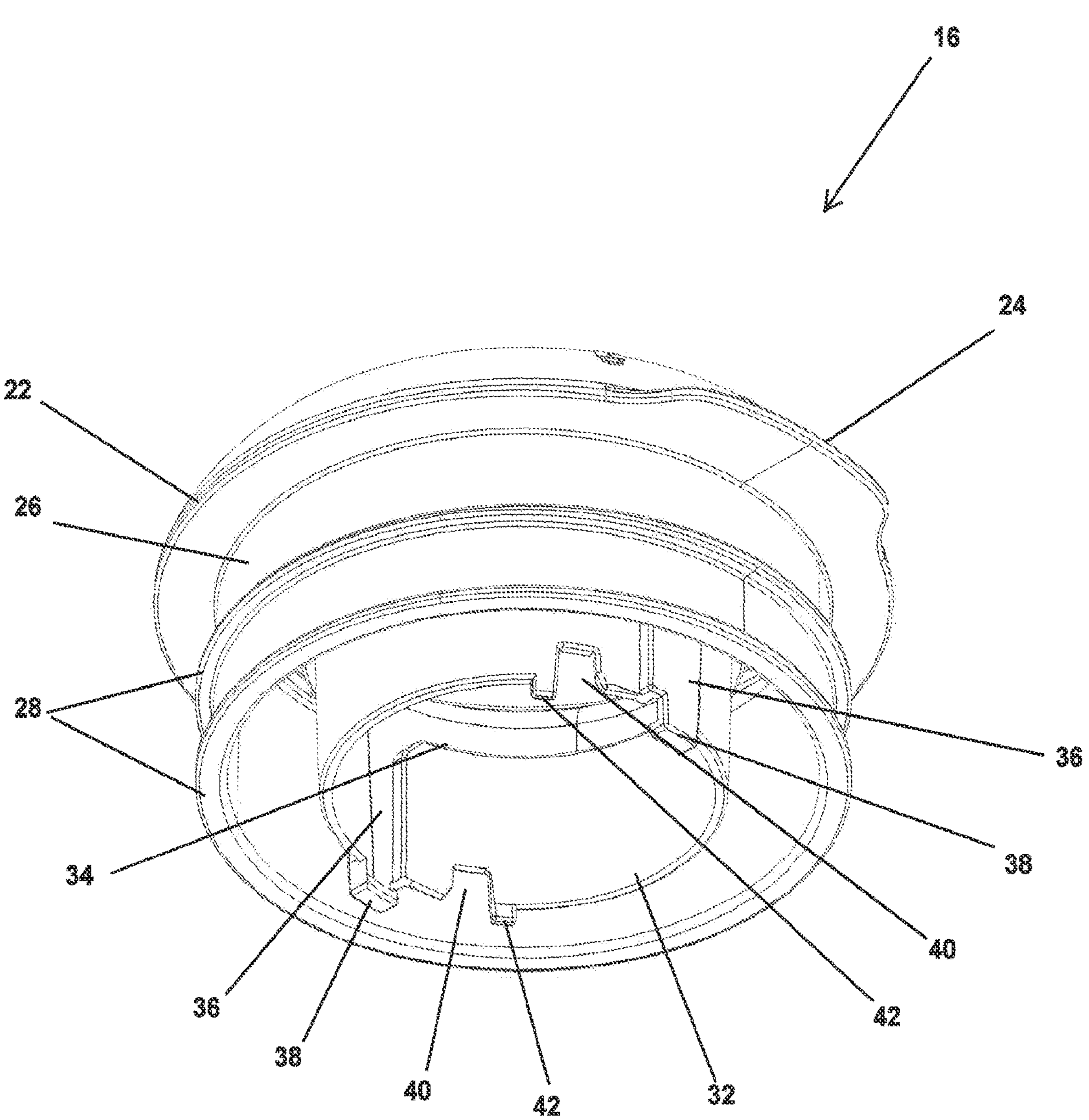
FIG. 8 is a bottom perspective view of the outer sealing section of the venting appliance lid of FIG. 7.
Figure 9:
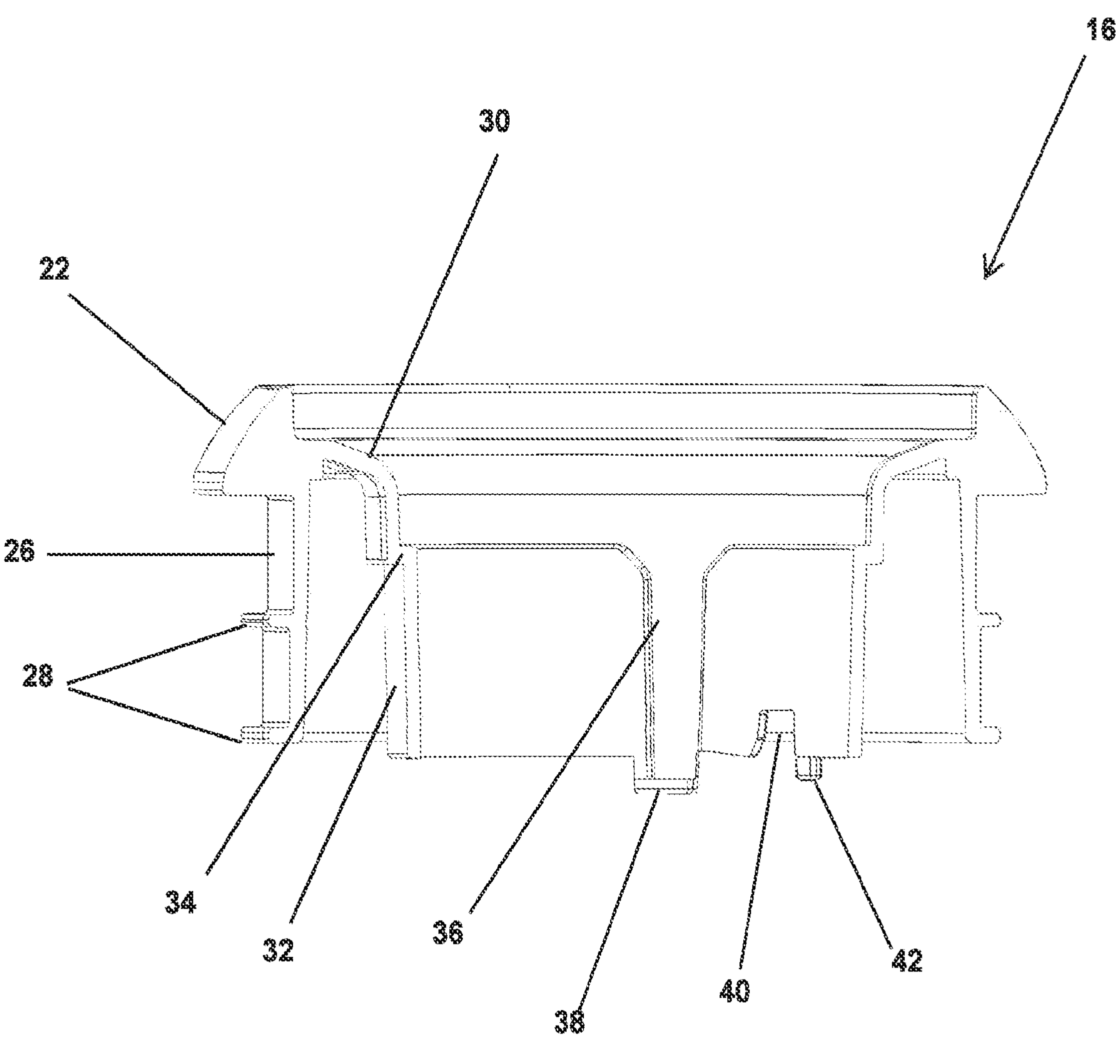
FIG. 9 is a section view of the outer sealing section of th venting appliance lid of FIGS. 7 and 8.
Figure 10:
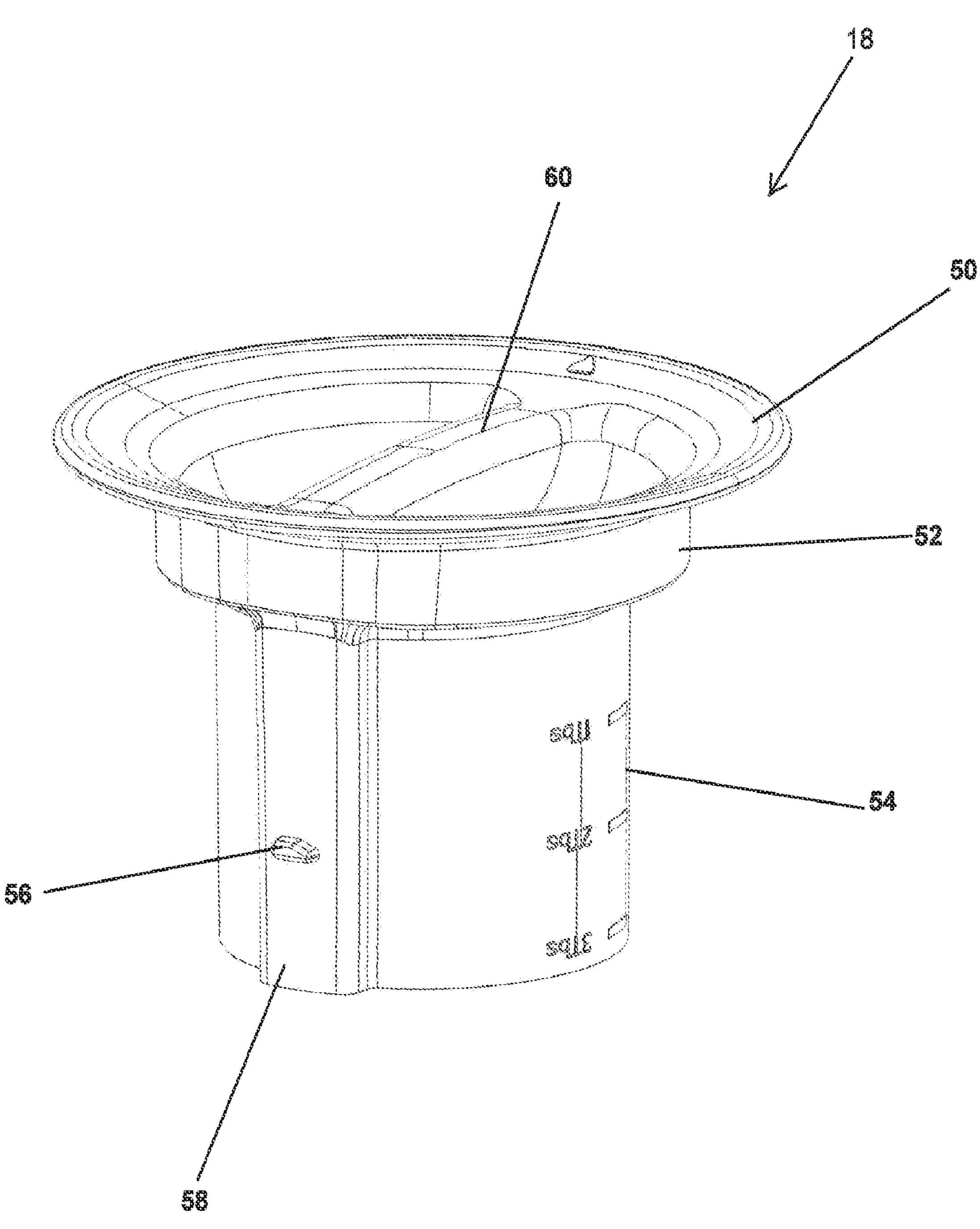
FIG. 10 is a top perspective view of a center cap for a venting appliance lid according to an embodiment of the present disclosure.
Figure 11:
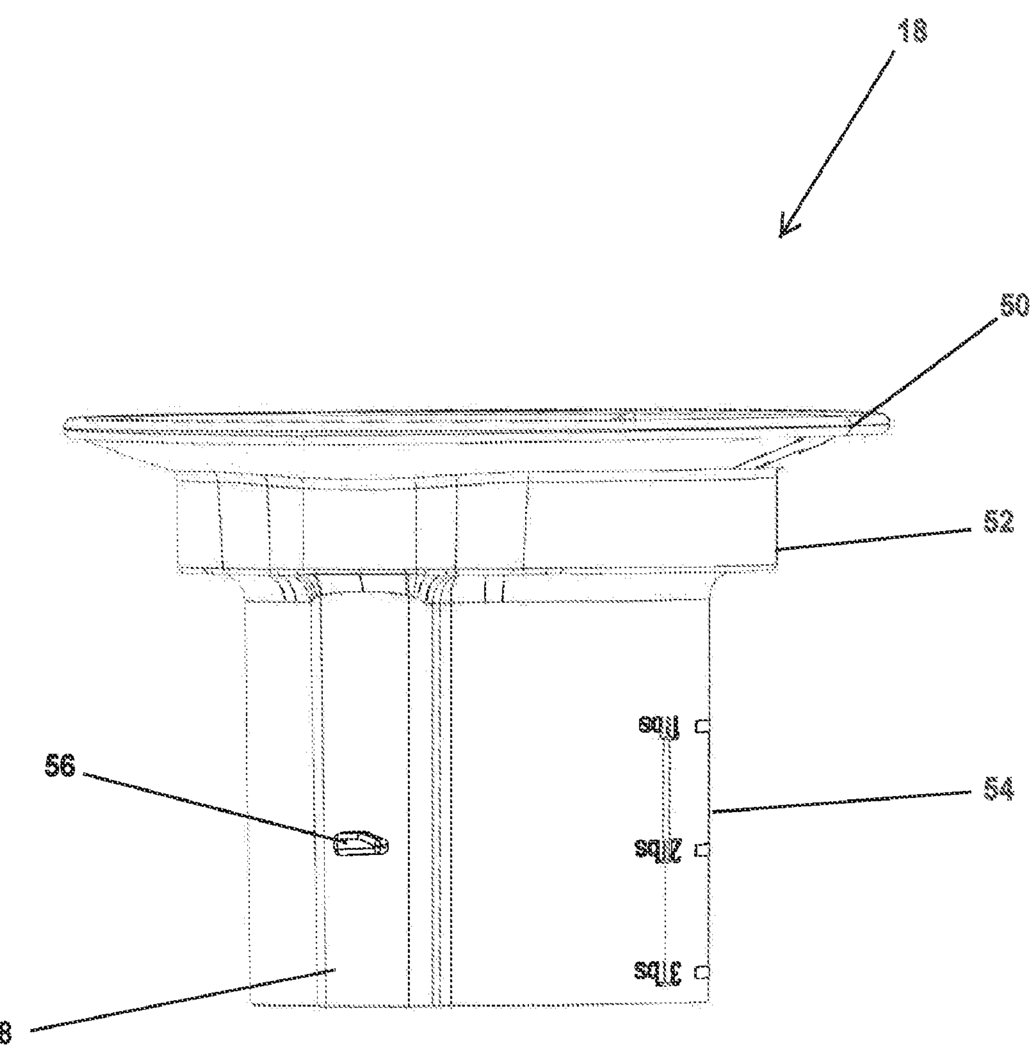
FIG. 11 is a side view of the center cap of FIG. 10.
Figure 12:
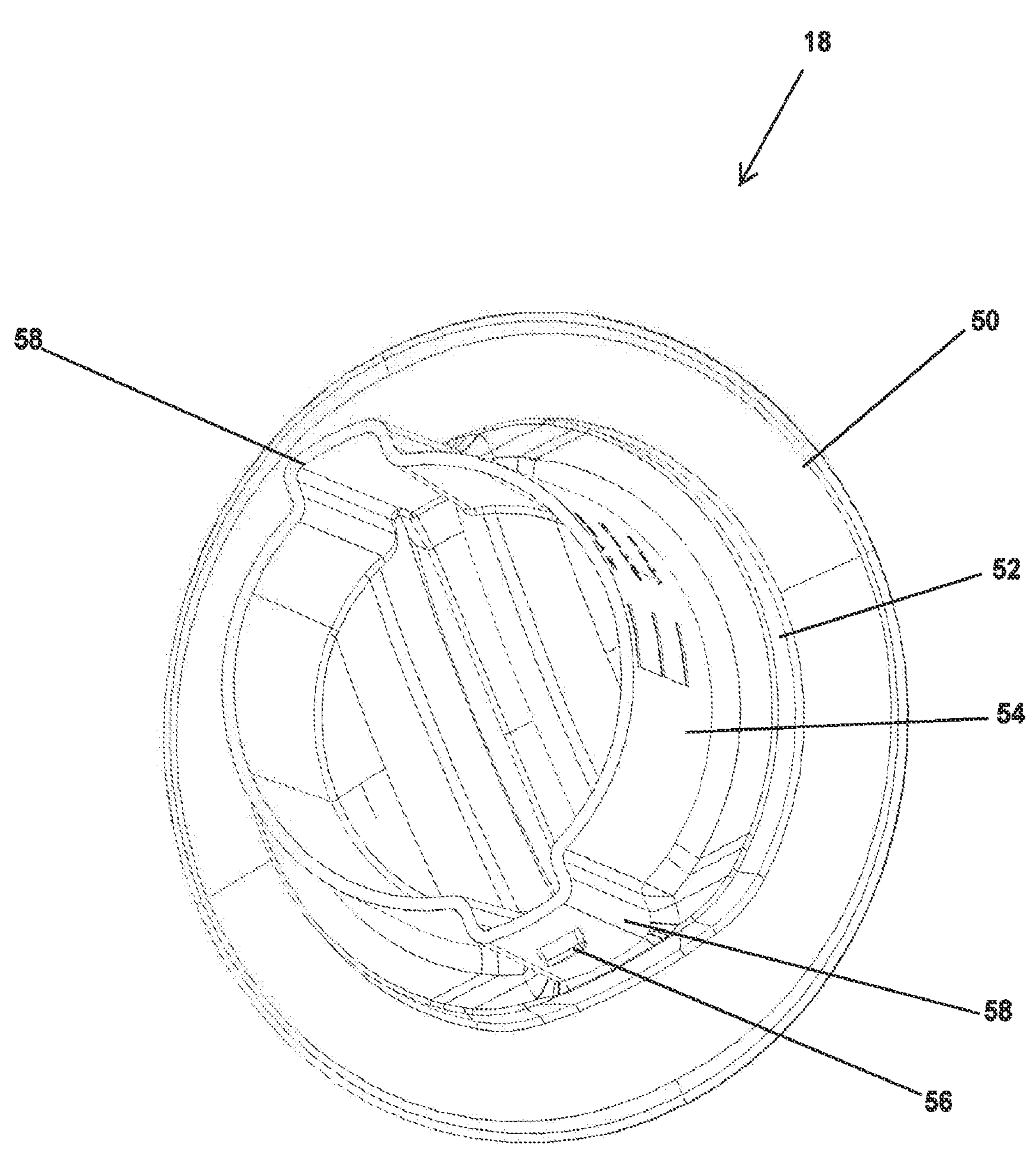
FIG. 12 is a bottom perspective view of the center cap of FIGS. 10 and 11.
Figure 13:
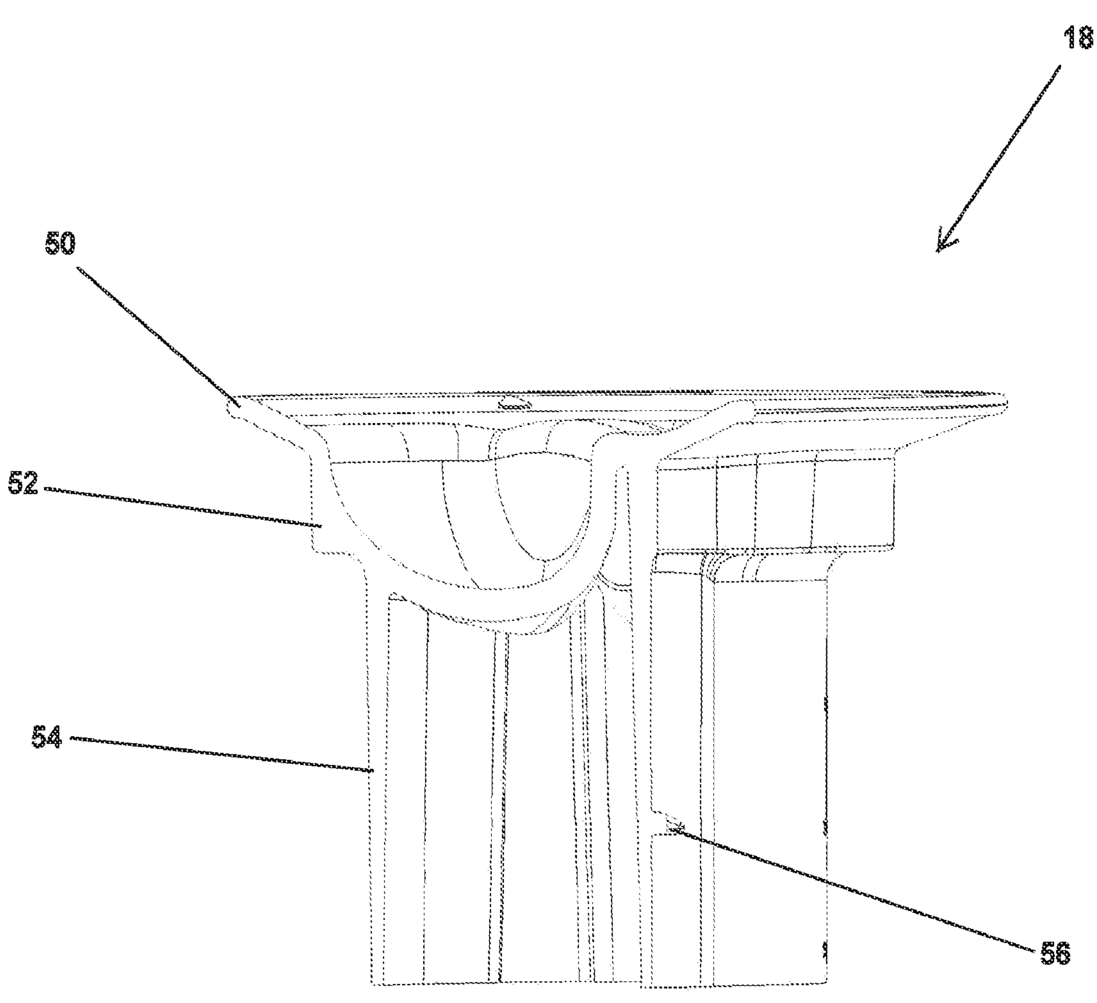
FIG. 13 is a section view of the center cap of FIGS. 10-12.

FIGS. 7-9 illustrate the outer sealing section 16 of an exemplary venting appliance lid 14 in more detail. The outer sealing section 16 is provided with a lid shoulder 30 along an inner circumference of the lid rim 22 and surrounding the central opening 20. In addition to an outer skirt 26, the outer sealing section 16 includes an inner skirt 32 that also depends downwardly on the lid rim 22. The lid shoulder 30 connects the lid rim 22 with the inner skirt 32. In preferred embodiments, the lid shoulder 30 is provided with downward slope, which may be curved, leading toward the central opening 20.

The inner skirt 32 contains a number of features to facilitate a desired engagement with the center cap 18. While these features will be introduced here, a more detailed description of their interaction with corresponding features of the center cap 18 will be presented below. The interior surface of the inner skirt 32 is provided with inwardly extended sections forming a ledge 34 extending partially around the circumference of the inner skirt 32. The ledge 34 is interrupted by at least one, and, in a preferred embodiment, two, vertical tab tracks 36. There may be chamfered transition surfaces leading from the ledge 34 to the vertical tab tracks 36. A vertical tab stop 38 is located at the bottom of each vertical tab track 36. The vertical tab tracks 36 extend, and the vertical tab stop 38 is located, below the bottom edge of the inner skirt 32. Adjacent to but circumferentially spaced slightly from the vertical tab track 36 and stop 38 is an expansion notch 40 that extends upward toward the lid rim 22. A rotation stop 42 is located at the far side, relative to the vertical tab track 36 and stop 38, of the expansion notch 40. The rotation stop 42 extends downward from the bottom edge of the inner skirt 32.

FIGS. 10-13 illustrate the center cap 18 of the illustrated embodiment of the venting appliance lid 14. The center cap 18 is configured to be inserted into the central opening 20 of the outer sealing section 16 and selectively secured within the central opening 20. However, the corresponding features of the center cap 18 and the outer sealing section 16 are configured to cooperate with each other to allow for a desired amount of vertical displacement of the center cap 18 relative to the outer sealing section 16, while still preventing the center cap 18 from being ejected from the central opening 20 due to any increase in pressure within the blender jar 14. The controlled vertical displacement of the center cap 18 creates a vent path to release pressure from the interior of the blender jar 14 while minimizing the escape of the liquid contents of the blender jar 14.

The center cap 18 includes a cap flange 50, a cap shoulder 52, and a cup 54. The cap flange 50 and shoulder 52 are configured to cooperatively fit within the lid rim 22 and lid shoulder 30. The underside of the cap flange 50 as it transitions toward the cap shoulder 52 is preferably provided with a concave surface that mates with the shape of the lid shoulder 30. As a result, when the center cap 18 is fully inserted into the central opening 20 the cap flange 50 rests on the lid shoulder 30 to close the gap between the outer sealing section 16 and the center cap 18.

Figure 5:
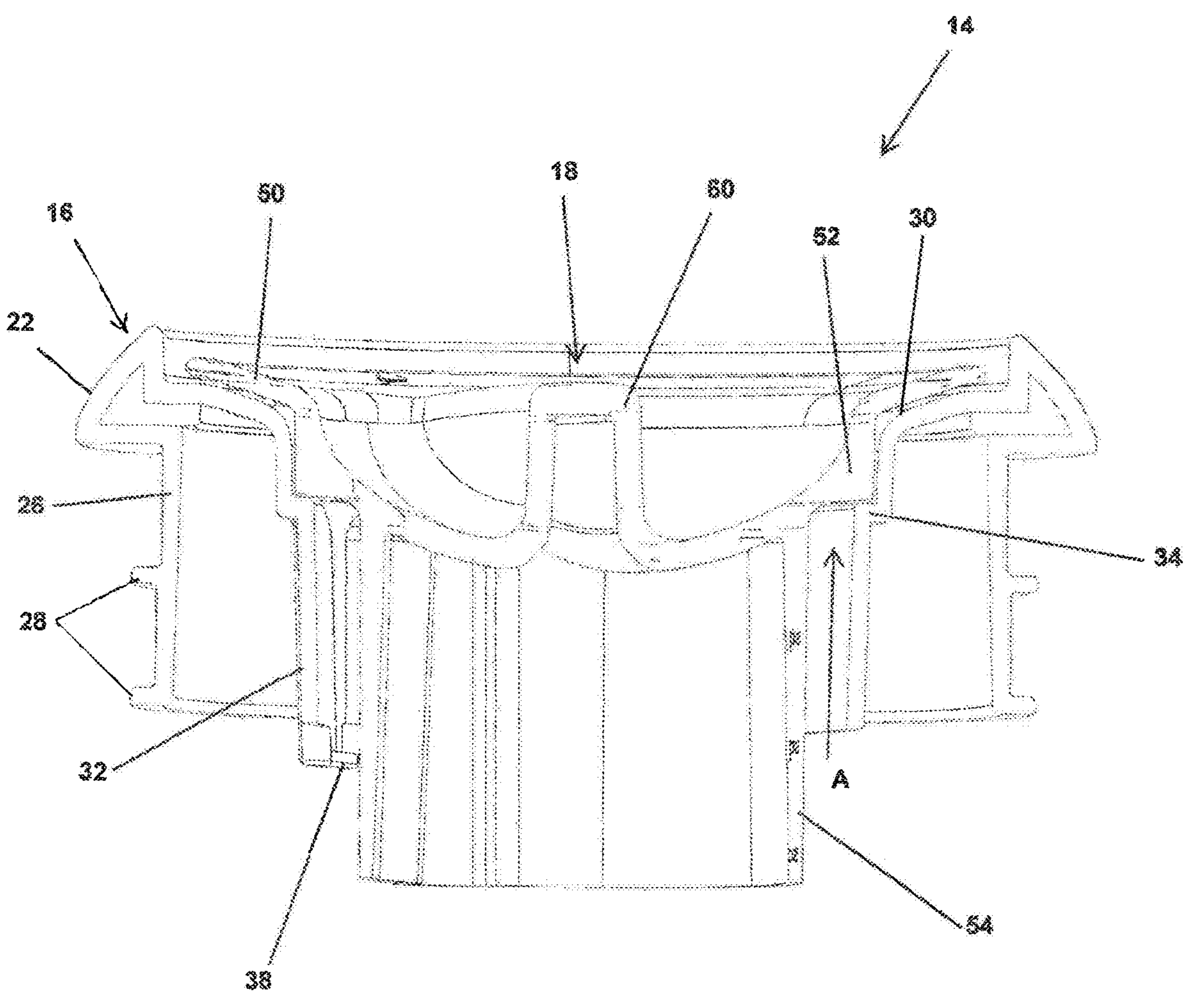
FIG. 5 is a partial section view of the venting appliance lid of FIGS. 3 and 4.
Figure 6:
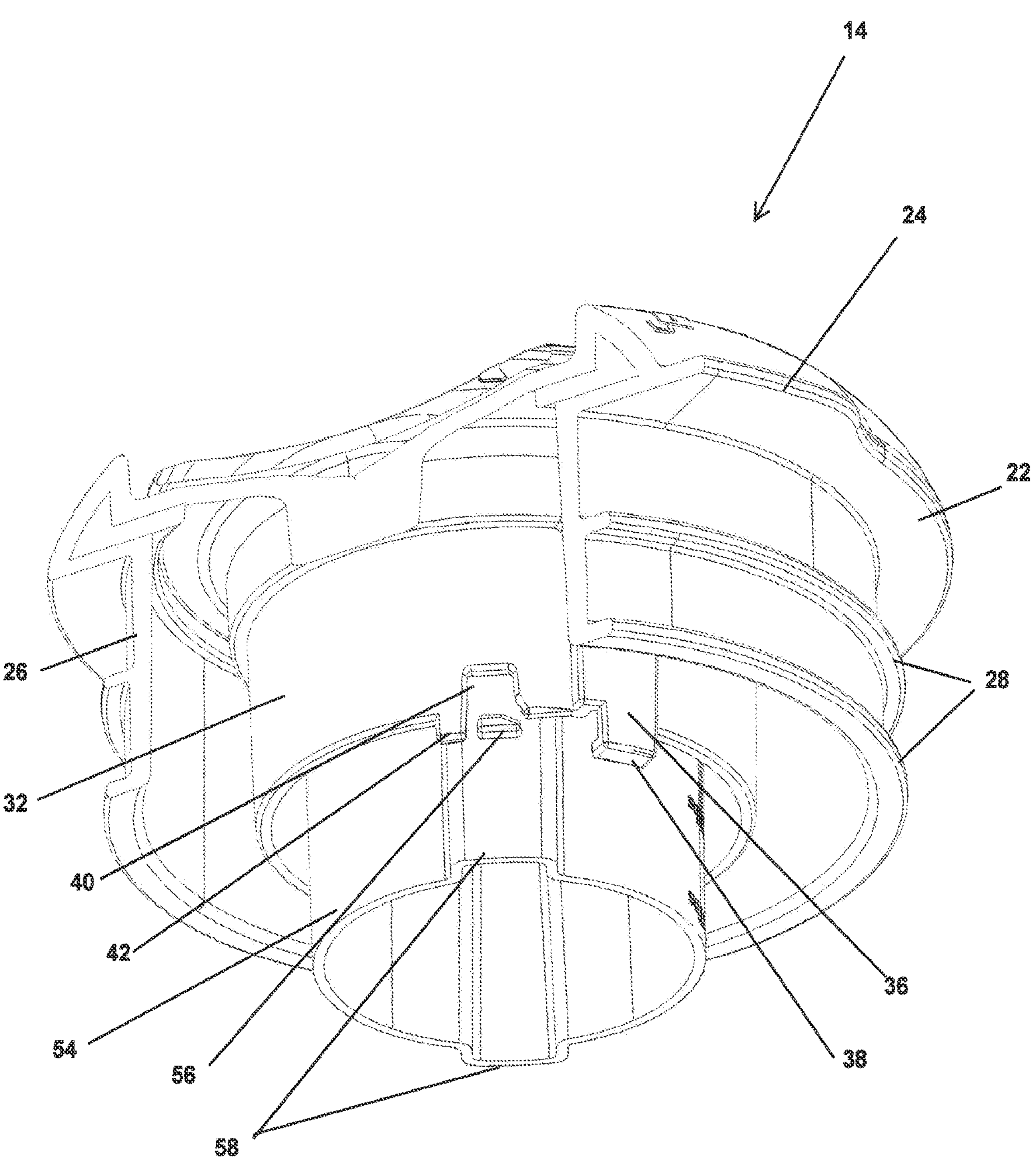
FIG. 6 is a partial section view of the venting appliance lid of FIGS. 3-5.

At least a portion of the circumference of the cup 54 is provided with an outer diameter that is somewhat smaller than the inner diameter of the inner skirt 32. This dimensional difference allows for a gap between the two components to form a portion of a vent path between the two components to allow pressure from the interior of the blender jar 14 to escape to atmosphere. The vent path is represented in FIG. 5 with arrow A. When the center cap 18 is fully inserted into the central opening 20, the engagement of the cap flange 50 with the lid shoulder 30 closes the gap between the two components. However, if the center cap 18 is lifted slightly, the cap flange 50 separates from the lid shoulder 30. This separation of the cap flange 50 from the lid shoulder 30 opens the vent path A between the cup 54 and inner skirt 32 to allow pressure from the blender jar 14 to vent to atmosphere. The center cap 18 lifts to separate the cap flange 50 from the lid shoulder 30 to open the vent path A in response to increased pressure within the blender jar 14.

In one embodiment the vent path A created by the separation of the cap flange 50 from the lid shoulder 30 has a cross-sectional area of at least 506 $mm^2$ in accordance with UL specifications. However, the vent path A and, more particularly, the components of the outer sealing section 16 and the center cap 18, may be adjusted to provide for a vent path area suitable for a particular application.

The exterior surface of the cup 54 is provided with at least one, and preferably two, locking tabs 56 that engage with the above-described features of the inner skirt 32. Each locking tab 56 may be located on a rail 58. The rail 58 properly positions the locking tab 56 so that it can engage with the corresponding features of the inner skirt while the remainder of the cup 54 remains spaced from the inner skirt 32. In particular, the rail 58 positions the locking tab 56 such that it extends beyond the diameter of the inner skirt ledge 34 but inside of the depth of the corresponding vertical tab track 36. The locking tab 56 is horizontally oriented and may be provided with a chamfer at one corner to facilitate engagement with the features of the inner skirt 32 as described below.

The cup 54 may be provided with measurement markings, e.g. 1 Tbs, 2 Tbs, 3 Tbs, as shown in the embodiment of FIG. 5 to allow use of the cup 54 as a measuring cup as well The engagement of the corresponding features of the center cap 18 and the inner skirt 32 are best seen in FIGS. 3-6. When the center cap 18 is inserted into the central opening 20, full insertion may be prevented by the locking tabs 56 being blocked by the inner skirt ledge 34. In order to insert the center cap 18 further, it must be rotated to align the locking tab or tabs 56 with corresponding vertical tab track or tracks 36. The larger diameter of the inner skirt 32 at the location of the vertical tab track 36 allows the locking tab 56 to pass through until it encounters the vertical tab stop 38, which blocks further insertion.

Note that at the same time, the underside of the cap shoulder 52 may encounter the inner skirt ledge 34. Therefore, there may be two locations where further insertion of the center cap 18 is positively stopped. In addition, the engagement of the cap shoulder 52 and inner skirt ledge 34 may serve as an additional closure of the vent path A between the outer sealing section 16 and the center cap 18.

While further downward vertical movement of the center cap 18 is prevented once the locking tab 56 reaches the vertical tab stop 38, the center cap 18 may still be rotated relative to the outer sealing section 16. The center cap 18 is provided with a handle 60 to facilitate rotation of the center cap 18. Rotation of the center cap 18 moves the locking tab 56 into alignment with the expansion notch 40. Alignment of the locking tab 56 with the expansion notch 40 is facilitated by the rotation stop 42, which prevents the center cap 18 from being rotated further beyond a desired alignment position. This position also represents a "locked" position of the center cap 18. As shown for example in FIG. 4, the top of the outer sealing section 16 may be provided with symbols or wording to indicate to a user whether the center cap is in the locked or in an unlocked position.

The alignment of the locking tab 56 with the upwardly extending expansion notch 40 allows for vertical movement of the locking tab 56, and therefore the center cap 18, by an amount equal to the height (t) of the expansion notch 40. As noted above, when the center cap 18 is allowed to lift relative to the outer sealing section 16, the cap flange 50 lifts slightly off of the lid shoulder 30, which opens the vent path A leading from the blender jar 14 interior, through the gap between the inner skirt 32 and the cup 54, through the now open gap between the cup flange 50 and lid shoulder 30 to atmosphere. In addition, in embodiments where the bottom of the cap shoulder 52 may engage the inner skirt ledge 34, the lifting of the center cap 18 would also separate those two components to prevent their engagement from keeping the vent path A closed.

Therefore, as pressure within the blender jar 14 increases, the greater pressure beneath the center cap 18 lifts it to open the vent path A. However, the continued engagement of the locking tab 56 with the expansion notch 40 prevents the center cap 18 from being ejected. As the interior pressure within the blender jar 12 decreases with the venting of excess pressure, the pressures above and below the center cap 18 equalize allowing the center cap 18 to drop back into a position in which the vent path A is closed.

The arrangement of the cap flange 50 and lid shoulder 30 also operates to minimize escaping liquid while still allowing excess pressure within the blender jar 12 to be vented. Steam escaping from the blender jar 12 through the vent path A will contain significant amounts of moisture. As the steam flows along the vent path A, its pressure rapidly drops along with the temperature, which causes the moisture contained within steam to condense on the surfaces of the venting appliance lid 14. As the steam rises along the vent path A of the venting appliance lid 14, it encounters the underside of the cap flange 50, which tends to collect condensing moisture from the escaping steam. This condensed fluid falls from the cap flange 50 and is directed by the downwardly sloping lid shoulder 30 back toward and down the vent path A so that it returns to the blender jar 12.

Figure 14:
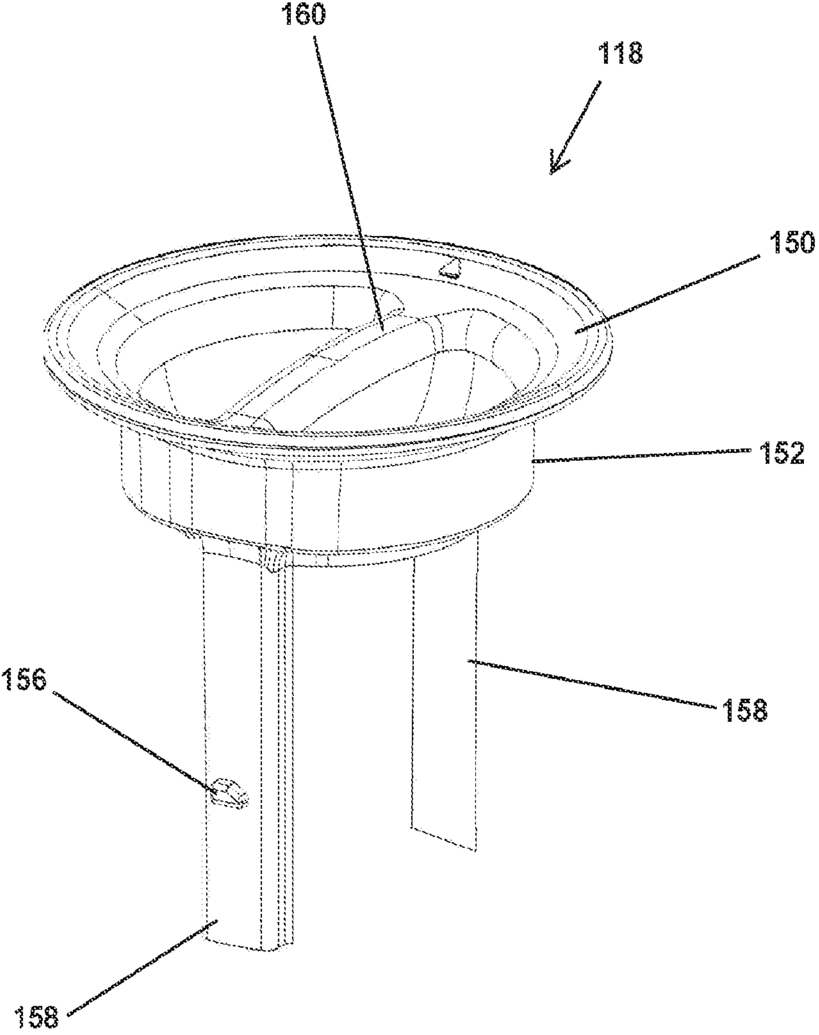
FIG. 14 is a top perspective view of a center cap for a venting appliance lid according to another embodiment of the present disclosure.

FIG. 14 illustrates another embodiment of a cap 118. In this embodiment, the cap does not include a cup. Rather, there are only one or more downwardly depending rails 158 extending from the cap flange 152. Each rail 158 includes a locking tab 156. The remainder of the cap 118 incorporates features similar to cap 18, including a flange 150 and a handle 160. The cap 118 cooperates with an outer sealing section of an exemplary venting appliance lid as described above.

The preferred embodiments of the disclosure have been described above to explain the principles of the invention and its practical application to thereby enable others skilled in the art to utilize the invention. However, as various modifications could be made in the constructions and methods herein described and illustrated without departing from the scope of the invention, it is intended that all matter contained in the foregoing description or shown in the accompanying drawings, including all materials expressly incorporated by reference herein, shall be interpreted as illustrative rather than limiting. Thus, the breadth and scope of the present invention should not be limited by the above-described exemplary embodiment, but should be defined only in accordance with the following claims appended hereto and their equivalents.

What is claimed is:

1. A venting appliance lid, comprising:

an outer sealing section having a rim and a shoulder defining a central opening and at least one downwardly depending skirt, wherein the rim is defined by an outermost surface of the outer sealing section and wherein the shoulder is provided along an inner circumference of the rim;

a center cap having a flange and a cup downwardly depending from the flange, wherein in a fully inserted position of the center cap within the central opening the flange rests on the shoulder;

wherein at least a portion of the downwardly depending skirt is provided with an inner diameter spaced by a gap from an outer diameter of the downwardly depending cup;

wherein the downwardly depending skirt has at least one expansion notch and the downwardly depending cup has at least one locking tab, wherein the center cap is rotatable relative to the outer sealing section to align the at least one locking tab with the at least one expansion notch and wherein the expansion notch is provided with a height allowing the locking tab to travel a vertical distance equal to the height of the expansion notch;

wherein exertion of a force on an underside of the center cap while the locking tab is aligned with the expansion notch raises the center cap by the vertical distance and separates the flange from the shoulder whereby the gap forms at least a portion of a vent path between the outer sealing section and the center cap and opening the vent path to atmosphere;

wherein the downwardly depending skirt further comprises at least one vertical tab track, the at least one vertical tab track having a vertical tab stop at a bottom end of the at least one vertical tab track, the vertical tab track extending below lower rim of the downwardly depending skirt; and wherein the at least one vertical tab track is provided with a width sufficient to allow the locking tab to travel vertically within the at least one vertical tab track until the locking tab encounters the vertical tab stop.

2. The venting appliance lid as set forth in claim 1, wherein the at least one vertical tab track and vertical tab stop are located adjacent to the expansion notch.

3. The venting appliance lid as set forth in claim 2, wherein one side of the vertical tab stop is open to allow rotation of the center cap relative to the outer sealing section in a direction toward the expansion notch once the center cap is fully inserted in to the outer sealing section.

4. The venting appliance lid as set forth in claim 3, further comprising a rotation stop located to a side of the expansion notch opposite of the at least one vertical tab track and vertical tab stop such that the rotation stop prevents further rotation of the center cap once the locking tab is generally aligned with the expansion notch.

5. The venting appliance lid as set forth in claim 4, wherein each of the locking tab and the expansion notch are provided with corresponding chamfered corners to facilitate vertical travel of the locking tab into the expansion notch.

6. The venting appliance lid as set forth in claim 1, wherein the shoulder is provided with a gradual slope leading to the central opening.

7. The venting appliance lid as set forth in claim 6, wherein the gradual slope of the shoulder is rounded.

8. The venting appliance lid as set forth in claim 6, wherein the cap flange is provided with a profile corresponding to the gradual slope of the shoulder.

9. The venting appliance lid as set forth in claim 1, wherein the rim is provided with at least one lift flange.

10. The venting appliance lid as set forth in claim 1, wherein the downwardly depending skirt is provided with at least one sealing flange configured for sealing engagement with the inside diameter of a blender jar.

11. The venting appliance lid as set forth in claim 1, wherein the cup is provided with at least one vertical rail, wherein the at least vertical rail is configured for sliding engagement with the at least one vertical tab track, and wherein the locking tab is located on an outer surface of the at least one vertical rail.

12. A venting appliance lid, comprising:

an outer sealing section having a rim and a shoulder defining a central opening and a downwardly depending skirt, wherein the rim is defined by an outermost surface of the outer sealing section and wherein the shoulder is provided along an inner circumference of the rim;

a center cap having a flange and at least one rail depending downwardly from the flange, wherein in a fully inserted position of the center cap within the central opening the flange rests on the shoulder;

wherein the downwardly depending skirt has at least one expansion notch and the at least one downwardly depending rail has at least one locking tab, wherein the center cap is rotatable relative to the outer sealing section to align the at least one locking tab with the at least one expansion notch and wherein the expansion notch is provided with a height allowing the locking tab to travel a vertical distance equal to the height of the expansion notch; and wherein exertion of a force on an underside of the center cap while the locking tab is aligned with the expansion notch raises the center cap by the vertical distance and separates the flange from the shoulder creating at least a portion of a vent path between the downwardly depending skirt of the outer sealing section and the center cap and opening the vent path to atmosphere.

13. The venting appliance lid as set forth in claim 12, wherein the downwardly depending skirt further comprises at least one vertical tab track, the at least one vertical tab track having a vertical tab stop at a bottom end of the at least one vertical tab track, the vertical tab track extending below a lower rim of the downwardly depending skirt; and wherein the tab track is provided with a width sufficient to allow the rail to travel vertically within the vertical tab track until the locking tab encounters the vertical tab stop.

14. The venting appliance lid as set forth in claim 13, wherein the vertical tab track and the vertical tab stop are located adjacent to the expansion notch.

15. The venting appliance lid as set forth in claim 14, wherein one side of the vertical tab stop is open to allow rotation of the center cap relative to the outer sealing section in a direction toward the expansion notch once the center cap is fully inserted into the outer sealing section.

16. The venting appliance lid as set forth in claim 15, further comprising a rotation stop located to a side of the expansion notch opposite of the vertical tab track and vertical tab stop such that the rotation stop prevents further rotation of the center cap once the locking tab is aligned with the expansion notch.

17. The venting appliance lid as set forth in claim 16, wherein each of the locking tab and the expansion notch are provided with corresponding chamfered corners to facilitate vertical travel of the locking tab into the expansion notch.

18. The venting appliance lid as set forth in claim 12, wherein the shoulder is provided with a gradual slope leading to the central opening.

19. The venting appliance lid as set forth in claim 18, wherein the gradual slope of the shoulder is rounded.

20. The venting appliance lid as set forth in claim 18, wherein the cap flange is provided with a profile corresponding to the gradual slope of the shoulder.

21. The venting appliance lid as set forth in claim 12, wherein the rim is provided with at least one lift flange.

22. The venting appliance lid as set forth in claim 12, wherein the outer skirt is provided with at least one sealing flange configured for sealing engagement with the inside diameter of an appliance jar.

* * * * *